United States Patent Office 2,766,770
Patented Oct. 16, 1956

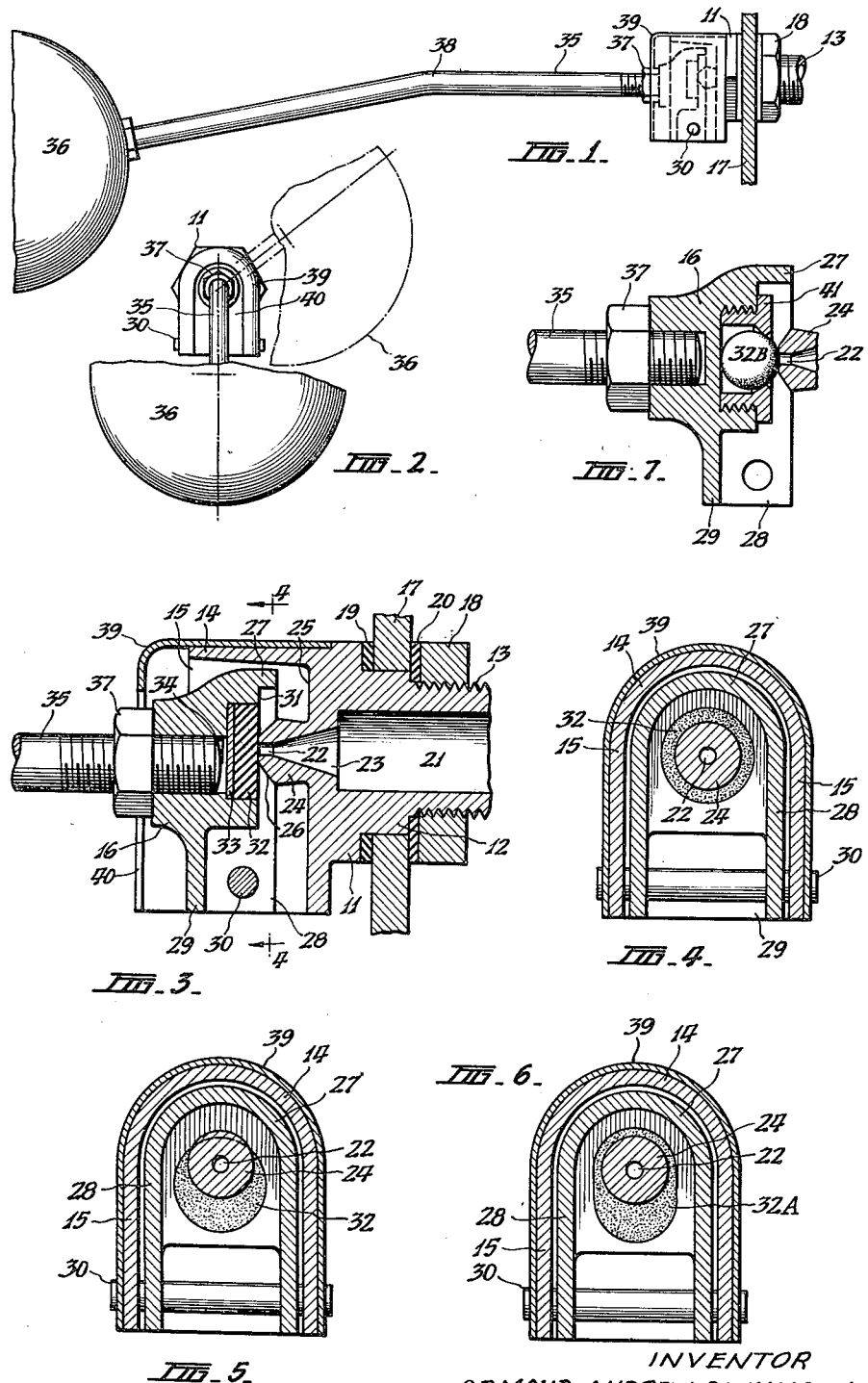

2,766,770

CISTERN FLOAT VALVES

Ormond Andrew Dickinson, Strathmore, near Melbourne, Victoria, Australia

Application July 15, 1953, Serial No. 368,120

Claims priority, application Australia July 17, 1952

3 Claims. (Cl. 137—437)

This invention relates to improvements in cistern float valves and it refers particularly to an adjustable valve member adapted to be operated by the float of a cistern or the equivalent, and to the manner of mounting said valve member. The term "cistern float valve" is used to include all equivalent apparatus, that is to say, all float controlled valve devices.

The invention has been devised particularly with the object of providing an improved construction of cistern float valve. A further object is to provide a cistern float valve which will be relatively economical to manufacture and so designed that it may be made by mass production methods. Another object is to devise a construction of cistern float valve having a resilient valve seating member which may be used in a number of different positions. A still further object is to provide, in float-operable valve devices, a valve seating member will be of simple design, cheap to make, and which will have a relatively long life in use. Yet another object is to devise relatively simple but effective means for adjusting the height of a float on a float arm connected to a movable valve member.

The invention devised with these and other objects in view resides, broadly, in the provision of valve devices including a body portion adapted to be connected to a water input pipe, a cover at one end of said body portion, a valve seat holder pivotally mounted in the cover and adapted to have a float arm connected to it, the valve seat holder being adapted to accommodate a valve seat member at such a location that the valve seat member may be engaged with the end of a water inlet opening so as to shut off the flow of water.

It is a feature of the invention that the valve seat member may be so mounted in the valve seat holder that it may be turned to present a fresh portion of its surface to the end of the water inlet. For this purpose the valve member is preferably set off-centre or eccentrically relative to the water inlet and it may be of cylindrical or other suitable shape. It is also a feature of the invention to mount the float and the float arm in such manner that the height of the float relative to the valve devices may be adjusted by turning the float arm about its axis.

In order that the invention will be clearly understood and readily put into practical effect I shall now describe a preferred construction of cistern float-controlled valve mechanism and several modifications thereof. These constructions are illustrated in the accompanying drawings, wherein:

Fig. 1 is a view of the apparatus in side elevation, only portion of the float being shown.

Fig. 2 shows the apparatus in end view, with an alternative position of the float being shown in dotted outline, the float being cut away in each case;

Fig. 3 is a longitudinal vertical cross-section of the valve devices, on enlarged scale;

Fig. 4 shows a transverse vertical cross-section through the valve devices, the section being taken on the line and in the direction indicated by the arrows 4—4 in Fig. 3;

Figs. 5 and 6 are views, similar to Fig. 4 illustrating modified arrangements and constructions of the valve seat; and Fig. 7 is a longitudinal vertical cross-section of a still further modification of the valve seat and valve seat holder.

Referring initially to the construction illustrated by Figs. 1–4, there is provided a body member 11 having a rearwardly-extending neck portion 12 and an externally screw-threaded shank 13 which is adapted to have a water pipe connected to its outer or rear end. The body member 11 also has a forwardly-extending curved top 14 and two sides 15 which constitute a cover for a valve seat holder 16. The body member 11 is adapted to be secured within a wall 17 of a cistern tank by means of a nut 18 screwed on to the shank 13, washers 19 and 20 being provided to effectively seal the opening in the cistern tank wall 17 against leakages therethrough.

Within the body member 11 is a passageway 21 which is co-axial with the shank 13 and neck 12. The front end portion 22 of this passageway 21 is of reduced diameter and intermediate of the portion 22 and the main part of the passageway 21 is a tapered portion 23, the passageway portion 22 and part of the tapered portion 23 being a nose member 24 which extends forwardly of the front face 25 of the body member. The front of the nose member 24 is tapered, at 26.

The valve seat holder 16 has a curved top portion 27, two sides 28 and a front plate 29, the top 27 and sides 28 being slightly smaller in external dimensions than the internal dimensions of the top 14 and sides 15 of the body member 11 so that said valve seat holder 16 can fit freely within the top 14 and sides 15 of the body member 11. The valve seat holder 16 is fulcrumed on a pin 30 which is fitted transversely through the sides 15 of the body member 11 and the sides 28 of the valve seat holder 16. The valve seat holder 16 may, then, be moved pivotally relative to the body member as the float is raised or lowered.

A recess is formed in the rear face 31 of the valve seat holder 16 and a valve seat 32 is mounted in said recess, the valve seat 32 being so located that when the holder 16 is fitted within the cover 14, 15 of the body member 11 and on the fulcrum pin 30 then the valve seat 32 may be moved into registration with the front end of the nose member 24 so as to close the opening at the front of the passageway part 22—see Fig. 3. In the construction shown in Figs. 1–4 the valve seat 32 is substantially co-axial with the passageway 21, 22, 23 and the nose member 24 and a backing plate 33 is fitted in the recess to provide a support for the valve seat 32.

An internally screw-threaded opening or socket 34 is formed in the valve seat holder 16 and in that opening is engaged one end of a float arm 35 which is attached at its opposite end to a float 36. A lock nut 37 is provided for the purpose of locking the arm 35 in set position relative to the valve seat holder 16.

The float arm 35 is bent at a location, 38, intermediate in its length so that the float 36 at the front end of the arm is offset relative to the central axis of the opening 34. By loosening the lock nut 37 and then turning the float arm 35 the height of the float relative to the valve seat holder 16 may be adjusted. When so adjusted it may be locked in adjusted position by tightening the nut 37 on the arm 35.

As shown in Fig. 3 the opening 34 in the valve seat holder 16 extends rearwardly into the recess in which the valve seat 32 is mounted. If it be required to eject the valve seat 32 from that recess the nut 37 may be loosened and the arm 35 screwed sufficiently far into the opening 34 to force the backing plate 33 and the valve seat 32 out of its recess.

The apparatus will operate in well known manner. When the apparatus is mounted within a cistern tank and the float arm 35 adjusted to suit requirements the float will cause the valve seat holder 16 to turn pivotally about the pin 30 so as to open the front end of the water passageway in the body member 11. Then, water can flow through the passageway and into the tank until such time as the level of the water reaches the height at which the float 36, acting through the float arm 35, causes the valve seat 32 to press tightly against the end of the nose member 24 and shut off the flow of water through the passageway part 22.

A housing 39, having a vertical slot 40 in its front side, is fitted to the body member 11 so as to fit about the valve devices without interfering with the operation thereof. The body member 11, valve seat holder 16 and housing 39 are so shaped that there will be no sideways splashing of water from the passageway 22. Owing to the provision of the curved top 27 and sides 28 of the valve seat holder 16 any water striking the inner surfaces thereof will be deflected downwardly. The housing 39 is provided for the purpose of preventing any mist escaping sideways or upwards from the valve devices, as well as for the purpose of protecting the valve devices against damage.

In use the valve seat 32 will become worn and less effective, and it may then be removed from its recess, turned so that a new, unworn surface will be presented to the nose member 24, and replaced in the recess.

In a slight modification of the apparatus illustrated in Fig. 3 the opening 34 does not extend into the recess wherein the valve seat 32 is mounted. In this construction the opening 34 is a blank or dead-end opening. There is, then, no need to provide the backing plate 33 and the seat 32 may be removed from its recess by prising it out with a pointed tool or other suitable implement.

Referring now to Fig. 5 it will be noted that the valve seat 32 is so located in the valve seat holder 16 that it is off-centre relative to the central axis of the water passageway part 22. With this construction the valve seat 32, when it has become worn in one part, may be removed from its recess, then turned about its axis so that a new or unworn part of the surface will be presented to the nose member 24, and then replaced in its recess.

In Fig. 6 there is illustrated a slightly different construction in which the valve seat 32A is non-circular, having semi-circular ends and straight sides. This valve seat is so located in the valve seat member 16 that the nose member 24 engages it at a position at about the centre of the upper semi-cylindrical end. When that seating part becomes worn the valve seat may be removed, turned end for end, and then replaced so as to present an unworn portion of its surface for engagement with the nose portion 24.

Fig. 7 illustrates a still further form of valve seat—a substantially spherical seating member 32B which is mounted in a cap 41 screwed into the recess in the surface 31 of the valve seat holder 16. This figure of the drawings illustrates, also, the blank or dead-end opening 34 into which the float arm 35 is screwed. When one part of the surface of the seating member 32B becomes worn the cap 41 may be loosened, the ball 32B turned so as to present an unworn surface to the end of the nose member 24 and the cap then tightened again.

The body member 11 and the valve seat holder 16 may be conveniently made principally by hot pressing operations and the housing 30 may be made by sheet metal pressing operations. Consequently, there will be achieved substantial economy in production.

The several features of the invention are conducive to economy of production, ease of installation and of maintenance, and long life in service.

I claim:

1. In a cistern float valve, a valve body adapted to be connected at one end to a water supply pipe and having a water outlet at the other end, a cover at the outlet end of said body, a valve seat holder pivotally mounted in said cover, said holder having a recess in an end face thereof which is in opposition to the outlet of said body and an opening adapted to receive an end of a float arm, a valve seat member fitted snugly within the holder recess, and a float arm adjustably inserted in the holder opening, such opening extending through the holder to the recess, whereby the float arm engaged in the opening may be forced into the recess to eject a valve seat member disposed in the latter.

2. In a cistern float valve, a valve body adapted to be connected at one end to a water supply pipe and having a substantially horizontal water outlet at the other end, a cover at the outlet end of said valve body, said cover being in the form of a hood having top and side walls which project appreciably beyond the outlet and a slotted outer end wall, the bottom of said cover being open, a valve seat holder having an end face bounded at the top and sides by a forwardly projecting flange, a valve seat member removably mounted by said holder at such end face thereof, means pivotally connecting the holder to said cover with the valve seat member arranged in opposition to the outlet of the valve body, and a float arm attached to said holder and extending outwardly through the slot in the outer end wall of the cover, raising and lowering of the arm rocking the holder to move the valve seat member against and away from the valve body outlet, the flanged and seat member supporting end of the holder being disposed in the space defined by said cover, whereby the cover and flange are cooperably effective to deflect incoming water downwardly.

3. A cistern float valve as set forth in claim 1 wherein the valve seat member is mounted in a recess formed in the flanged holder end and the holder is provided with an opening within which an end of the float arm is adjustably inserted, such opening extending through the holder to the recess so that the float arm can be forced into the latter to eject the valve seat member.

References Cited in the file of this patent

UNITED STATES PATENTS

| 386,242 | Fry | July 17, 1888 |
| 755,000 | Hedberg | Mar. 22, 1904 |
| 1,489,403 | Wesdell | Apr. 8, 1924 |
| 2,059,359 | Karges | Nov. 3, 1936 |